Aug. 3, 1965  M. STAUNT  3,197,869
SELF-LUBRICATING AND SELF-CLEANING DENTAL HANDPIECES
Filed Jan. 8, 1957  6 Sheets-Sheet 1
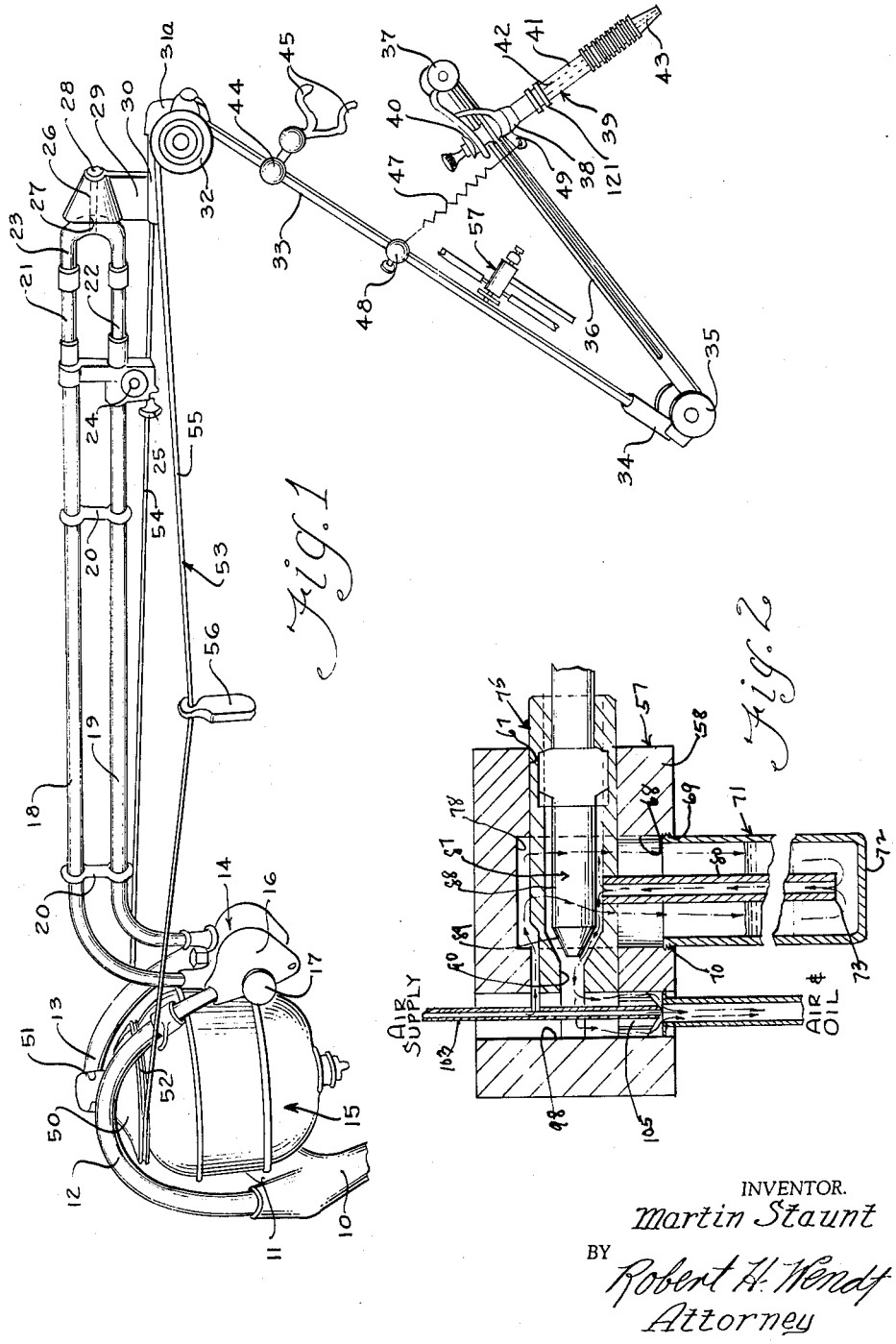
INVENTOR.
Martin Staunt
BY Robert H. Wendt
Attorney

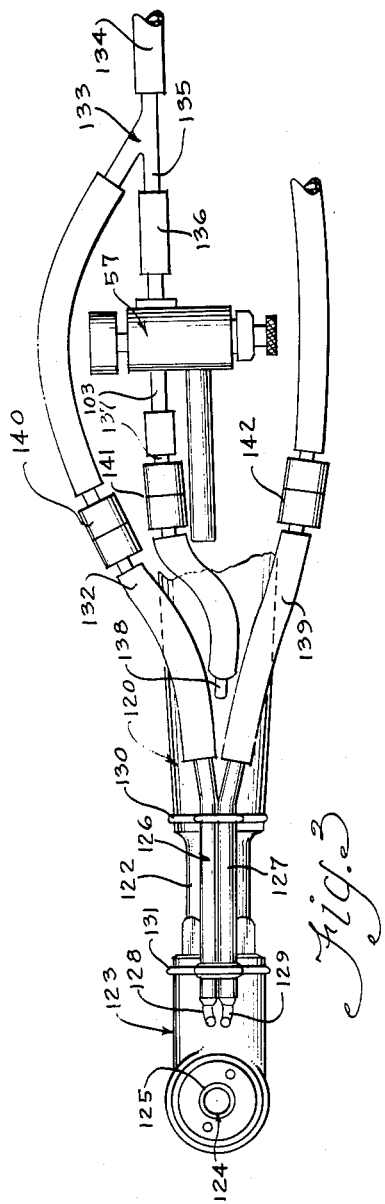
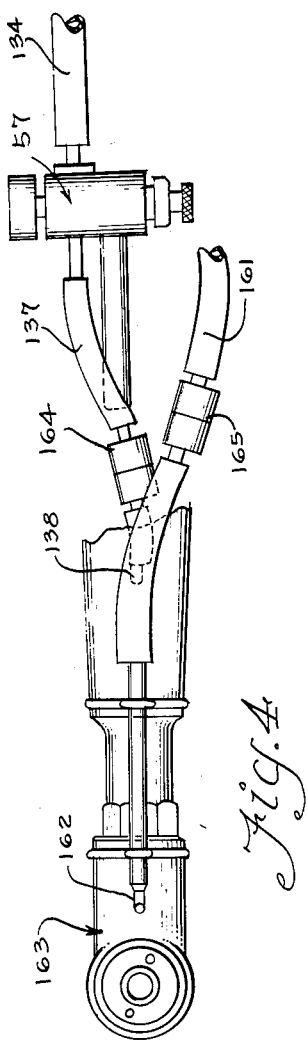

INVENTOR.
Martin Staunt
BY Robert H. Wendt
Attorney

Aug. 3, 1965 M. STAUNT 3,197,869
SELF-LUBRICATING AND SELF-CLEANING DENTAL HANDPIECES
Filed Jan. 8, 1957 6 Sheets-Sheet 4
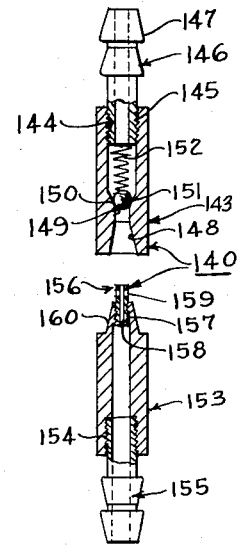
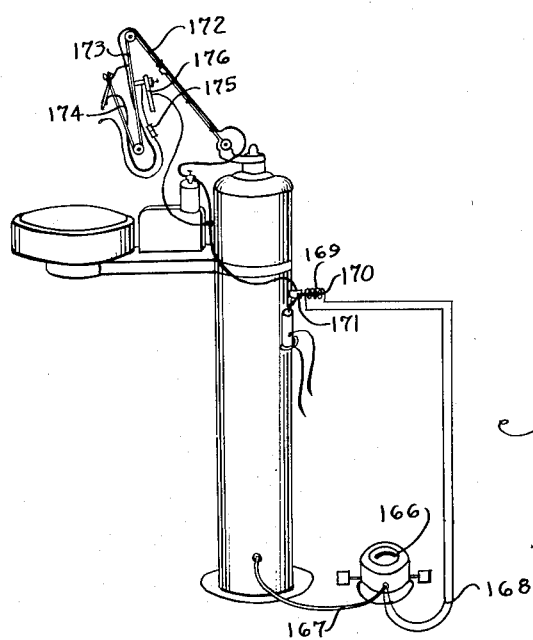
INVENTOR.
Martin Staunt
BY Robert H. Wendt
Attorney Aug. 3, 1965 M. STAUNT 3,197,869
SELF-LUBRICATING AND SELF-CLEANING DENTAL HANDPIECES
Filed Jan. 8, 1957 6 Sheets-Sheet 5

INVENTOR.
Martin Staunt
BY Robert H. Wendt
Attorney

Aug. 3, 1965   M. STAUNT   3,197,869
SELF-LUBRICATING AND SELF-CLEANING DENTAL HANDPIECES
Filed Jan. 8, 1957   6 Sheets-Sheet 6

INVENTOR.
Martin Staunt
BY Robert H. Wendt
Attorney

United States Patent Office 3,197,869
Patented Aug. 3, 1965

3,197,869
SELF-LUBRICATING AND SELF-CLEANING
DENTAL HANDPIECES
Martin Staunt, Des Plaines, Ill., assignor, by mesne assignments, to American Hospital Supply Corporation, Evanston, Ill., a corporation of Illinois
Filed Jan. 8, 1957, Ser. No. 633,067
The portion of the term of the patent subsequent to Apr. 19, 1980, has been disclaimed
18 Claims. (Cl. 32—26)

The present invention relates to self-lubricating and self-cleaning dental handpieces, and is particularly concerned with improved handpieces adapted to be driven at very high speeds and also adapted to be self-lubricating and self-cleaning.

One of the objects of the invention is the provision of an improved dental handpiece assembly which is so constructed as to provide for a constant flow of oil and air through the ball bearing contra angle for lubricating and cleaning purposes, thereby greatly extending the life of the ball bearing contra angle and also excluding foreign particles or saliva from the handpiece because of the fluid pressure on the inside of the handpiece.

Another object of the invention is the provision of an improved dental handpiece assembly including an oil reservoir for containing a lubricant of a nontoxic type so that the lubricant may be forced into the handpiece and permitted to maintain a pressure on the inside of the handpiece, which keeps all foreign materials and saliva out of the handpiece.

Another object of the invention is the provision of an improved dental handpiece assembly including an improved contra angle of the ball bearing type and means for automatically lubricating and cleaning the contra angle to keep the ball bearings lubricated at all times and to cool the ball bearings while the handpiece is operating.

Another object of the invention is the provisions of an impoved high speed dental handpiece and contra angle which is simple, capable of economical manufacture, which may be operated at a very high speed, and which may be used for a long period of time without excessive wear on the ball bearings of the handpiece or the contra angle.

Other objects and advantages of the invention will be apparent from the following description and the accompanying drawings, in which similar characters of reference indicate similar parts throughout the several views.

Referring to the six sheets of drawings accompanying the specification,

FIG. 1 is a side elevational view of the dental hand piece and driving motor assembly embodying the invention;

FIG. 2 is an axial sectional view, taken through a lubricant reservoir and lubricant dispenser embodying the invention;

FIG. 3 is a fragmentary bottom plan view of the contra angle assembly, including the present lubricant reservoir and suitable connections for introducing lubricant and air into the interior of the contra angle and for providing air or air and water for cooling the dental tools used with the handpiece;

FIG. 4 is a view similar to FIG. 3 of a modification;

FIG. 8 is an exploded view of the parts of a self-closing tube connector and ball valve, which is used with a detachable contra angle so that the tubing leading to the contra angle may be disconnected when the contra angle is removed;

FIG. 9 is a diagrammatic view showing the arrangements of parts for connection and control of the supplies of air, water and lubricant;

Figure 5:
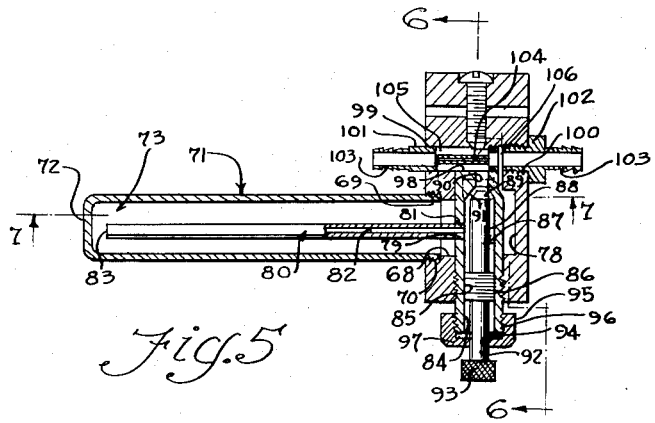
FIG. 5 is an axial sectional view taken through a modified from lubricant reservoir and dispenser.
Figure 6:
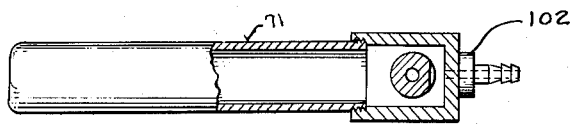
FIG. 6 is a sectional view taken on the plane of the line 6—6 of FIG. 5.

Referring to FIG. 1, this is a fragmentary elevational view, showing an improved dental engine and handpiece assembly, including the present lubricant reservoir. In this view 10 indicates the motor-supporting arm, which is bifurcated at 11 and provided with a pair of tubular gooseneck arms 12 and 13, terminating in a motor-supporting bracket 14, to which the motor 15 is secured.

The gooseneck arms 12 and 13 carry the bearing members 16, which support a transverse shaft 17 for pivotally mounting the motor-supporting bracket 14. The bracket 14 also carries the upwardly and laterally curved trombone arms 18, 19 which are provided with fixed spacers 20, holding the trombone arms 18, 19 parallel to each other.

At their free ends the trombone arms support the telescoping tubes 21, 22, which are joined by a U shaped member 23, and which are adapted to slide in and out in the trombone arms to adjust the belt tension.

The tube 22 carries a rack engageable with a screw on the shaft 24, which may be driven by a knob 25 to cause the telescoping tubes 21 or 22 to move in or out for adjusting their length.

The U shaped member 23 supports an oval bracket 26 having a socket 27 for receiving the U shaped member 23, to which the bracket 26 is secured by a single screw bolt 28 passing through the bracket and threaded into the U shaped member 23. The bracket 26 has a laterally extending web 29 carrying a tubular member 30, which supports the pulley bracket 312 carrying a pair of idler pulleys 32 and an engine arm 33.

The engine arm 33 carries another idler pulley bracket 34 at its lower end, this bracket being provided with a pair of idler pulleys 35; and bracket 34 provides a pivotal mounting for the handpiece arm 36, which has a pair of idler pulleys 37 at its end and also has a wrist joint 38 for supporting the dental handpiece 39, which has a pulley 40 on its spindle.

The dental handpiece includes an outer sheath 41 for rotatably supporting an inner spindle 42 having a chuck 43 for carrying a contra angle having a shaft to be gripped by the chuck.

The engine arm 33 carries a handpiece supporting bracket 44, which projects laterally from the arm 33 and has a pair of forked members 45, 45 on which the handpiece may be hung. A tension spring 47 extends between the point 48 on the arm 33 and a bracket 49 carried by the handpiece, and provides support for the handpiece. Spring 47 supports the handpiece in the position of FIG. 1 when the user does not see fit to place it on the bracket 45.

The motor 15 is provided with a bell shaped pulley 50 having a groove 51 in its hub above the goosenecks 12, 13 and between them, and also having a peripheral groove 52 about its lower edge. This latter groove in the larger end of the bell shaped pulley is located below and outside the goosenecks 12, 13 and is used for higher speeds.

An endless cord belt 53 extends about the pulley 50 in the groove 52 outside the gooseneck arms 12 and 13 and has two substantially parallel portions 54 and 55 which extend over and about the idler pulleys 32.

From the idler pulleys 32, belt 53 extends about the idler pulleys 35; and from these pulleys it extends about idler pulleys 37 and has a loop extending about the handpiece pulley 40. The proper tension on the belt is a necessity to prevent the belt from slipping if it is too loose and to prevent it from jumping off the pulleys if it is too tight.

The correct tension may be achieved by hanging a weight 56 on the belt at 55 and adjusting the tension by moving the trombone arm end 23 until the belt has a predetermined amount of sag which is specified for this equipment.

Figure 7:
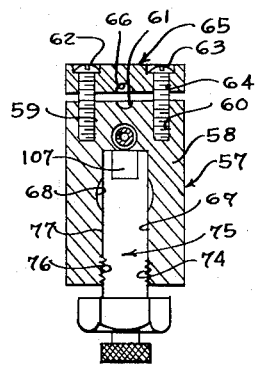
FIG. 7 is a sectional view taken on the plane of the line 7—7 of FIG. 5.

The arm 33 preferably supports the combined lubricant reservoir and dispenser 57, which may be clamped on the arm 33 by means of a clamp of the type shown in FIG. 7. In this figure the body of the lubricant dispenser is indicated at 58; and this body has a pair of threaded bores 59 and 60 located on either side of a partially circular groove 61.

Screw bolts 62 and 63 pass through apertures 64 in a clamping member 65 and are threaded into the bores 59 and 60. Clamping member 65 has a partially cylindrical groove 66; and the size of the grooves 61 and 66 is such that they are adapted to receive the arm 33 on which the dispenser 57 is clamped by means of screw bolts 62, 63.

The lubricant dispenser 57 comprises a solid metal body 58, which may be cylindrical in shape, and which has an axially extending bore 67, which communicates with a transversely extending bore 68. The bore 68 is threaded at 69 at its outer end for receiving the threaded end 70 of a transparent plastic lubricant reservoir 71.

The lubricant reservoir 71 is preferably transparent plastic and comprises a cylindrical tube closed at its end 72, and having its other end threaded into the bore 68 at 69. The reservoir 71 is preferably transparent so that it may be observed when it is full of lubricant and replaced when the lubricant level gets down to the line 73 on the reservoir.

Such reservoirs are provided already filled with a suitable nontoxic lubricant, which cannot injure the patient.

The bore 67 is threaded at 74, near its outer end, for receiving a threaded plug 75. Threaded plug 75 has a larger externally threaded portion 76 for engaging the threads 74 and has a cylindrical portion 77 fitting in the bore 67. There is a clearance or counterbore in the bore 67 at 78 about the plug 58 and communicating with the transverse bore 68 and with the reservoir 71.

The plug 75 is provided with a transverse bore 79, which is threaded to receive a suction tube 80 having a threaded end 81 fitting in the plug, and having a through bore 82 extending into its open end 83. The suction tube 80 extends into the reservoir 71 and is immersed in the lubricant as long as there is a supply in the reservoir.

Plug 75 is provided with an internal bore 84 having internal threads 85 for receiving the external threads 86 carried by a valve 87. Valve 87 has the reduced cylindrical portion 88, terminating in a frusto-conical end 89 adjacent the smaller cylindrical opening 90 in the end of plug 75.

The bore 70 terminates in a frusto-conical portion 91 of the same angularity as the end 89 on the valve 87 so that this frusto-conical portion 91 may serve as a valve seat for the valve end 89, for restricting the flow of lubricant.

At its other end valve 87 has a cylindrical stem 92 provided with a knurled head 93. Stem 92 passes through an opening 94 in the internally threaded cap 95, which is threaded on the threaded portion 96 of the plug 87.

A rubber gasket 97 fits tightly around the stem 92 and is compressed against the end of the plug 87 by cap 95, thus providing a seal around the stem and at the end of the plug, permitting adjustment of the valve without leakage.

The bore 90 at the end of the plug 87 communicates with a transverse bore 98, which is threaded at its ends 99 and 100 to receive the threaded nipples 101 and 102. These nipples have peripheral ridges 103 on their outside for tightly engaging and holding the plastic tubes that are attached to these nipples for the air supply and for carrying the lubricant to the handpiece.

The nipple 102 has a reduced end provided with a bore for receiving a tube 104, which may be, for example, of three thirty-seconds diameter with a .0009 inch wall. This provides an inside diameter of sufficient size to pass the necessary amount of air and direct it toward the nipple 101.

The tube 104 is surrounded by a plug 105 adjacent the nipple 101; and plug 105 has four longitudinally extending grooves, providing apertures when the plug is in the bore 98. These apertures aid in mixing the oil with the air, and pass the oil into the air stream.

The threaded bore 100 has its threads undercut; and a transverse hole 106 is provided, which leads to the clearance 78 and passes through the bore 98 to provide an air supply hole leading to the reservoir. Air comes in the nipple 103, passes through the hole 106 to the counterbore 78, and is impressed on the top of the lubricant in the reservoir 71, forcing the lubricant into the tube 80.

The plug 75 may comprise a plexiglass rod, which is machined to provide for the valve, and which is milled flat across at 107, at its end, to permit the passage of air.

The operation of this lubricant reservoir and dispenser is as follows:

The air enters through the nipple 103 and separates into two passages at the aperture 106 and the counterbore 78. The air in the counterbore 78 places a pressure on the oil in the reservoir 71, forcing the oil up the tube 80 through the valved opening 90 into the oil chamber 98.

The oil then goes through the passages formed by the grooves in plug 105 and is mixed with air as air emerges from the tube 104.

The air pressure should not exceed twenty pounds; and all connecting parts are sealed against oil or air leakage; and the combined dispenser and reservoir is connected in a circuit, as follows:

Referring to FIGS. 3 and 4, these are fragmentary bottom views of the air, water and lubricant connections for a removable contra angle of the type disclosed in my prior applications, Serial No. 494,607, filed March 16, 1955, for Dental Handpieces, now abandoned, refiled as a continuation-in-part, as Serial No. 833,412, filed August 13, 1959, and issued August 28, 1962, as Patent 3,050,856, a further continuation-in-part being filed August 27, 1962, Serial No. 219,537, Air Driven Handpieces; and Serial No. 620,434, filed November 5, 1956, for Dental Handpieces, now Patent 2,988,815, and Serial No. 633,068, filed January 8, 1957, for Contra Angles for Dental Handpieces, now Patent 2,911,721, issued November 10, 1959.

This contra angle has a removable sleeve, indicated at 120, replacing the sleeve 41 of FIG. 1, by merely rotating a collar 121 on the handpiece and substituting the unit 120.

The sleeve 120 carries a tubular extension 122, which carries the contra angle housing 123, having the usual driven shaft, as described in my prior applications above, with a bevel gear for driving the bur tube 124, in which the tool shanks are placed.

125 indicates a sleeve of nylon, as described in my prior application for surrounding the bur shank and preventing foreign matter from entering.

Figure 12:
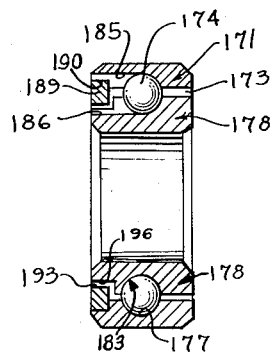
FIG. 12 is a sectional view, showing the type of ball bearings employed in the contra angle, for retaining lubricant while permitting a limited amount of leakage of air and lubricant from the contra angle.
Figure 13:
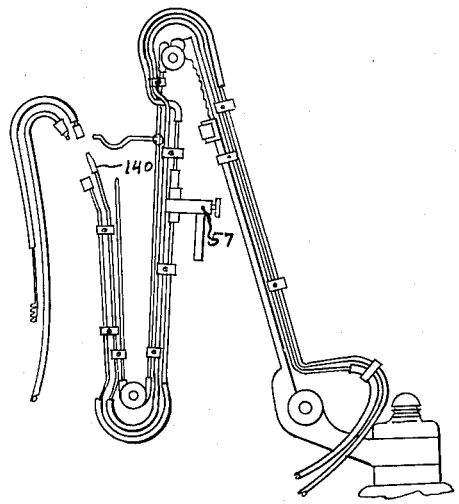
FIG. 13 is a fragmentary side elevational view showing the arrangement of conduits on the dental engine arm.

For maintaining a predetermined pressure inside the contra angle housing 123, the contra angle is provided with ball bearings for the ends of the bur tube 124, of the type shown in FIG. 12.

These ball bearings have outer races 171 and inner races 178, comprising annular members provided with the ball grooves 177 and 183, for receiving the balls 174. The ball grooves are provided at one side with the ball insertion openings 185 and 186, through which the balls are inserted in the ball grooves.

The races are provided with annular grooves 190 and 196 on the side on which the ball insertion grooves are located; and the annular groove 190 is adapted to receive a nylon sealing ring 189, which projects toward the groove 196 on the inner race, but has a close clearance so that the nylon ring 189 tends to prevent the escape of lubricant through the ball bearing but does permit the escape of a limited amount of air and lubricant through the ball bearings of the contra angle to maintain a pressure inside the contra angle housing.

The lubricant employed and the structure of the contra angle is as described in my prior applications, which are hereby incorporated by reference thereto.

Referring to FIG. 3, the attachment 120, carrying extension 122 and contra angle 123, is provided with the air tube 126 and water tube 127, having nozzles 128 and 129, directed toward the end of the bur in bur tube 124.

These air and water tubes 126, 127, are carried by plates 130 and 131, which are clamped between extensions 122 and the adjacent parts 120 and 123, as described in my prior applications.

The tube 126 has its end connected with a plastic flexible tube 132, carrying air and leading to a Y or T connector 133, which is connected to flexible plastic tube 134, leading to a supply of air provided in the building or by a special compressor.

The Y-connection has two branches, and the branch 135 is connected by a flexible tube 136 to the combined lubricant reservoir and dispenser 57, previously described.

The lubricant dispenser 57 has its outlet 103 connected by a flexible tube 137 to an inlet tube 138, leading to the interior of the sleeve 120 and to the interior of the contra angle housing, carrying air and lubricant in the form of a mist to the interior of the contra angle.

The tube 127 is connected by means of a flexible plastic tube 139 to a source of water under pressure, such as the city water connection, provided on the column of the dental chair.

As the contra angle attachment, including sleeve 120, extension 122, and contra angle 123, is detachable it is necessary to provide detachable connections for the various plastic tubes.

140 indicates a combined connector and ball valve which is used in the air line 132. 141 indicates a similar device in the air and lubricant line 137; and 142 indicates a similar device in the water line 139.

All of these combined connectors and ball valves may be substantially as described in FIG. 8, in which one of the devices 140 is shown in detail.

Each such combined connector and ball valve includes a female fitting 143, which may be made of brass, and comprises a cylindrical metal member having a threaded bore 144 for receiving the threaded end 145 of a metal tube 146, with ridges 147 for retaining the plastic tubing.

Metal tube 146 is the inlet of the female fitting 140. At its opposite end member 143 has a frusto-conical tapered bore 148, terminating in a small cylindrical bore 149, having an annular edge 150 serving as a seat for a ball valve 151.

A spring 152 engages the end of the fitting 146, and has its circular end engaging the ball valve 151, tending to hold the ball on its seat 150, when the device 140 is disconnected.

The device 140 includes a male member 153, which is cylindrical in shape, and may have a threaded bore 154 in its outlet end provided with a similar hose fitting 155.

Bore 154 extends through the male member 153, which is provided with a short externally threaded tube 156, threaded into a threaded bore 157 and projecting from the end of the male fitting 153.

Tube 156 has a through bore 158 and a pair of transverse apertures 159 outside the fitting. The tube 156 projects from the end of the male member 153, which has a frusto-conical portion 160 fitting in the complementary bore 148.

Tube 156 fits in the bore 149 and is long enough to raise the ball 151 from its seat. The male and female members 153, 143, are held together by friction due to the fit of the complementary parts, and when connected they provide for the free passage of air, water or combined air and lubricant or combined air and water.

When they are disconnected the male member is disconnected and removed with the contra angle in each case, and the ball 151 automatically closes the opening in the air, water or air and lubricant tubes.

Referring to FIG. 4, this is a modification in which the tube 161 is connected with a supply of combined water and air which is discharged from the nozzle 162, attached to this contra angle 163.

138 again indicates the inlet tube for combined air and lubricant in the form of a mist carried by tube 137 from the combined reservoir and lubricant dispenser 57, which is supplied by air directly from the tube 134. In this case one of the devices of FIG. 8 comprising a combined connector and a ball valve is indicated at 164 in the air and lubricant line 137, and another is employed at 165 in the combined air and water line 161.

Referring to FIG. 9, 166 indicates the foot control for the engine, comprising a potentimeter connected by electrical conductors 167 to the motor. Two conductors 168 are connected in parallel with conductors 167 and extend to a solenoid 169, for actuating the plunger 170, which controls a valve 171 for the supply of air and water which is turned on whenever the engine is started.

In this case the tubes which carry air and water are attached to the engine arm 172 and permitted to curve at the joints and to extend down the next arm 173 and upward to the contra angle knee section, as indicated at 174.

The automatic ball valve connector is indicated at 175, and the automatic oiler is indicated at 176. Suitable clamps secure the flexible tubing and other parts to the engine arms.

Figure 10:
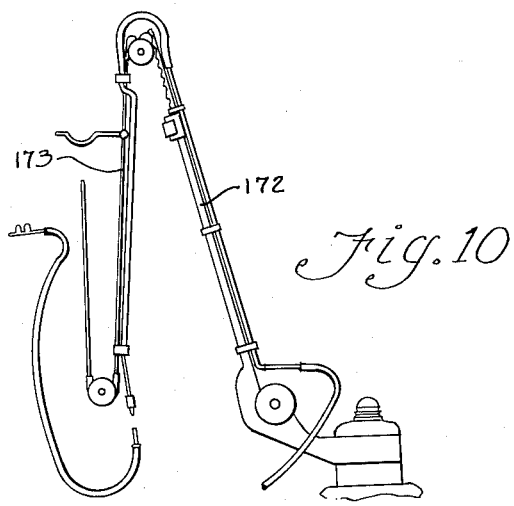
FIG. 10 is a view of a part of FIG. 9, showing the arrangement of tubes on the dental engine arms.

Referring to FIG. 10, these are views showing the tubes on the engine arms 172 and 173, comprising tubes for air and water.

Figure 11:
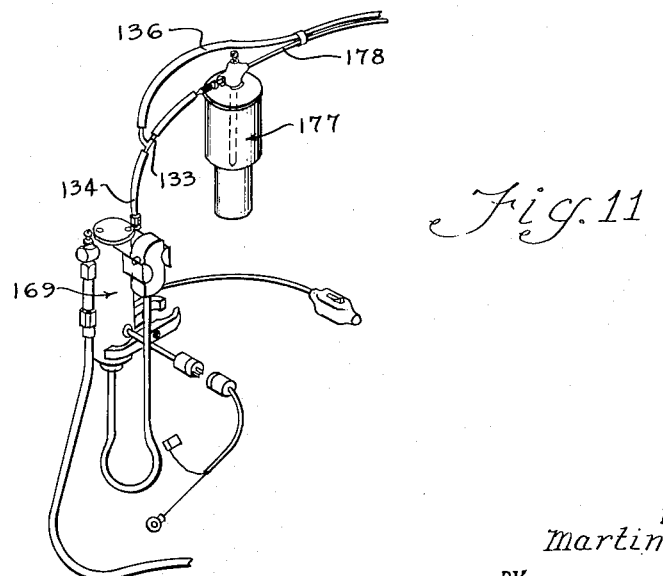
FIG. 11 is another view of a part of FIG. 9, showing the arrangement of the tubes to provide air for the automatic oiler.

Referring to FIG. 11, this is a view showing a solenoid unit 169 for controlling the supply of air by means of the air tube 134, which is provided with a T-connection 133, providing air to the lubricator through tube 136.

177 indicates a water container connected in the air line to provide air and water through tube 178, leading to the engine arm.

It will thus be observed that contra angle attachments as constructed according to my prior applications may be readily removed and others attached to the handpiece. When such an attachment is removed, its water and air lines are disconnected, but the outlets from these lines are automatically closed by means of my ball valve connector to prevent leakage until another attachment is connected and supplied with an air and water hose connection.

The lubricating devices and valve devices described herein may be used with contra angles having air supply and separate water supply, or with combined air and water supply; and in either case continuous lubrication by use of air and lubricant may be provided by introducing air and lubricant into the contra angle housing and supplying air and lubricant only when the device is running.

This saves a great deal of time for the dentist and makes all of his attachments easy to use and attach with an automatic supply of air, water and lubricant.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a self-lubricating and self-cleaning handpiece, the combination of a dental handpiece provided with an outer sheath and an inner spindle, said spindle having a chuck and ball bearings for supporting said spindle in said sheath, a contra angle having a drive shaft gripped by said chuck and driven by said spindle, said contra angle including a housing and a transverse tool shaft, ball bearings in said contra angle housing for rotatably supporting said tool shaft, a combined air and oil conduit extending into said contra angle housing rearwardly of said ball bearings and a source of air and oil under pressure for supplying air and oil to the interior of said contra angle housing for lubricating the ball bearings and constantly cleaning the ball bearings by excluding foreign material and permitting the air and oil to escape from the tool end of the ball bearing, said source including a lubricant reservoir and air conduits including a nozzle for the air and a conduit for placing pressure on the lubricant to be driven into the air stream.

2. In a self-lubricating and self-cleaning handpiece, the combination of a dental handpiece provided with an outer sheath and an inner spindle, said spindle having a chuck and ball bearings for supporting said spindle in said sheath, a contra angle having a drive shaft gripped by said chuck and driven by said spindle, said contra angle including a housing and a transverse tool shaft, ball bearings in said contra angle housing for rotatably supporting said tool shaft, a combined air and oil conduit extending into said contra angle housing rearwardly of said ball bearings and a source of air and oil under pressure for supplying air and oil to the interior of said contra angle housing for lubricating the ball bearings and constantly cleaning the ball bearings by excluding foreign material and permitting the air and oil to escape from the tool end of the ball bearing, said source including a lubricant reservoir and air conduits including a nozzle for the air and a conduit for placing pressure on the lubricant to be driven into the air stream, said source including a valve for throttling the amount of lubricant delivered to the air stream.

3. In a self-lubricating and self-cleaning handpiece, the combination of a dental handpiece provided with an outer sheath and an inner spindle, said spindle having a chuck and ball bearings for supporting said spindle in said sheath, a contra angle having a drive shaft gripped by said chuck and driven by said spindle, said contra angle including a housing and a transverse tool shaft, ball bearings in said contra angle housing for rotatably supporting said tool shaft, a combined air and oil conduit extending into said contra angle housing rearwardly of said ball bearings and a source of air and oil under pressure for supplying air and oil to the interior of said contra angle housing for lubricating the ball bearings and constantly cleaning the ball bearings by excluding foreign material and permitting the air and oil to escape from the tool end of the ball bearing, said source including a lubricant reservoir and air conduits including a nozzle for the air and a conduit for placing pressure on the lubricant to be driven into the air stream, said source including a valve for throttling the amount of lubricant delivered to the air stream, and also including an oil conduit surrounding said nozzle and having peripheral apertures for discharging oil adjacent the nozzle exit to turn the oil to a mist in the air.

4. A self-lubricating contra angle comprising a housing having two bores extending at right angles to each other, a bur tube for holding a bur shaft, having its open end extending out of one of said bores, said latter bore being provided with upper and lower ball bearings rotatably supporting said bur tube, and said latter bore having a threaded member threaded into the end of said bore, and said threaded member having an aperture surrounding said bur tube, but spaced therefrom, a nylon sleeve mounted on the bur tube in said aperture, and providing a limited leakage for air containing a mist of lubricant from said housing, a transverse shaft having driving connections with the bur tube and located in the other of said bores and supported by ball bearings therein, a lubricant reservoir, a source of air under pressure, forcing the lubricant from the reservoir into the air stream in the form of a mist, and a conduit delivering air and lubricant mist to the housing of the contra angle, to lubricate the ball bearings as it passes through them, the air leaking out of the contra angle housing after passing through the ball bearings.

5. A contra angle according to claim 4, in which the source of air and lubricant includes a conduit from a source of air pressure which extends to the lubricant reservoir, said reservoir being provided with a supply of liquid lubricant and a supply tube dipping therein and open at its bottom, the supply of lubricant being subjected to the air pressure, and said conduit including a restricting valve between the supply of lubricant and the housing for atomizing and breaking up the lubricant into a fine mist.

6. A contra angle according to claim 4, in which each of the ball bearings has an outer race and an inner race, the said races having registering partially circular grooves provided with balls, the grooves and balls being of such size that the races have a minimum clearance between each other for restricting the flow of air and lubricant through the ball bearings.

7. A contra angle according to claim 6, in which each race has an axially extending filling groove, the latter grooves registering with the races in a predetermined position so that the balls may be inserted therein, both races being provided with a cut-away portion for receiving a rectangular section ring of nylon frictionally held by one race and having a minimum clearance with the other race for effecting a pressure seal.

8. An automatic fluid connection and cut-off for air and water lines for dental handpieces, comprising a male body provided with a nipple for receiving a flexible supply tube at one end and having a frusto-conical formation at its other end extending to a shoulder, the said body having a through bore terminating in a threaded end provided with a tube threaded therein, said tube having a through bore and a lateral aperture adjacent its free end, and a female connector having a body adapted to receive the male body and provided with a through bore having a nipple at one end for engagement with a flexible tube, the other end terminating in a frusto-conical bore, and a cylindrical bore adapted to receive the tube in the male body, there being a seat, a ball valve, and a spring in the female body automatically closing off the female body when the male body is removed, and opening the ball valve by engagement with the tube in the male body when the male and female bodies are placed in juxtaposition.

9. A self-lubricating and self-cleaning handpiece assembly comprising a handpiece having a housing and a contra angle with a rotatable tool supporting spindle therein, a tool carried by said spindle, a source of air under pressure, a conduit extending from said source of air to a nozzle carried by the contra angle, said nozzle directing the air on said tool, said handpiece having a removable portion of said housing supporting said contra angle, and an automatically opening and closing valve located in said air conduit and housed in a detachable conduit connector, said conduit connector closing said valve when the conduit is disconnected at said connector and opening said valve when said conduit is connected at said connector, permitting the detachment of said removable portion of said handpiece with its nozzle while disconnecting the air and retaining the air under pressure at said source.

10. A self-lubricating and self-cleaning handpiece assembly according to claim 9, in which the automatically opening and closing valve comprises a male body provided with a nipple for receiving a flexible supply tube at one end and having a frusto-conical formation at its other end extending to a shoulder, the said body having a through bore terminating in a threaded end provided with a tube threaded therein, said tube having a through bore and a lateral aperture adjacent its free end, and a female connector having a body adapted to receive the male body and provided with a through bore having a nipple at one end for engagement with a flexible tube, the other end terminating in a frusto-conical bore, and a cylindrical bore adapted to receive the tube in the male body, there being a seat, a ball valve, and a spring in the female body automatically closing off the female body when the male body is removed, and opening the ball valve by engagement with the tube in the male body when the male and female bodies are placed in juxtaposition.

11. A dental handpiece assembly including a motor for driving a dental handpiece having a rotatable spindle for driving a removable chuck, said chuck having a housing, a water nozzle supported on said housing and directed toward a tool carried by said chuck, a conduit extending from said nozzle to a source of water under pressure, said conduit including an automatic fluid connection and cut-off for the water line, having a valve therein, said valve being opened upon connecting said fluid connection, and said valve being closed upon disconnecting said fluid connection to shut off the flow of water when the removable chuck and its nozzle are to be disconnected from the water line.

12. A dental handpiece assembly according to claim 11, in which the water connection also includes a solenoid valve and the motor is controlled by a combined switch and rheostat, said solenoid valve being closed when the motor switch is open, and said solenoid valve being opened to start the flow of water when the motor switch is closed.

13. A lubricating assembly for dental handpieces, comprising a body provided with an air inlet and an air outlet, a reservoir carried by said body for lubricant, an open bottom tube extending into said reservoir, a conduit extending from the air inlet to the reservoir to place pressure on the surface of the lubricant and force it into the tube, an air nozzle also communicating with said air inlet and discharging air from said outlet, a second conduit, a valve in said second conduit, said second conduit extending from said tube to said nozzle and having a plurality of restricted openings about said nozzle for passing and atomizing lubricant to discharge air and lubricant in the form of a mist from said body.

14. A lubricant assembly according to claim 13, in which the conduit is provided with a frusto-conical valve seat and said valve has a frusto-conical end and is provided with a threaded body for adjustment of the effective opening at the valve seat.

15. A lubricating assembly according to claim 13, in which the body is provided with a supporting block having a groove therein, and a clamping block having an opposing groove fitting on a dental engine arm, and threaded means for clamping the assembly on the engine arm.

16. A dental handpiece assembly including a dental handpiece, a motor for driving said dental handpiece, air and water nozzles carried by the dental handpiece, sources of air and water under pressure conduit connections from the air nozzle to said source of air under pressure, conduit connections from the water nozzle to said source of water under pressure, a solenoid valve for each of said conduit connections automatically closed when the circuit is open, a motor control switch for controlling the energization of said motor, said latter switch also controlling said solenoids, whereby the turning on of the handpiece motor also turns on the supply of air to the nozzles, and the turning off of the handpiece motor shuts off the air and water, said air and water connections including an automatic connector and disconnector fitting having a valve that closes the air and water conduit in each case when the nozzle conduits are disconnected and opens the conduit when the nozzle conduits are connected to air and water.

17. A dental handpiece assembly, comprising a housing having a tool shaft carried by ball bearings in said housing, a source of air under pressure, a lubricant mist dispenser having a lubricant reservoir and a nozzle connected to the source of air pressure and the lubricant reservoir to introduce lubricant into the air at the nozzle in the form of a lubricant mist, a conduit from said lubricant dispenser to the interior of said housing, the air under pressure carrying lubricant mist through the ball bearings to lubricate them, and said housing having an outlet for discharging air from the bearings.

18. A lubricant dispenser for introducing lubricant into air under pressure, comprising a body having an air inlet and an air-lubricant outlet, an air nozzle located between the air inlet and the air outlet, and having a nozzle opening and an oil conduit about said nozzle and a plurality of openings in said conduit, providing communication between the oil conduit and the air-lubricant outlet a lubricant reservoir carried by the body, and having a supply of lubricant under air pressure from said inlet, a lubricant tube having its open end extending into the lubricant and its other end in communication with one of the openings about said nozzle, the pressure on said lubricant feeding lubricant through said tube to one of the openings about said nozzle for, mixing the lubricant with the air issuing from the nozzle in the form of an air-lubricant mist.

References Cited in the file of this patent
UNITED STATES PATENTS

| | | |
|---|---|---|
| 718,561 | Basford | Jan. 13, 1903 |
| 2,125,251 | Thompson | July 26, 1938 |
| 2,390,710 | Henschel | Dec. 11, 1945 |
| 2,442,033 | Brantly et al. | May 25, 1948 |